(12) United States Patent
Lin et al.

(10) Patent No.: US 12,482,903 B2
(45) Date of Patent: Nov. 25, 2025

(54) BATTERY CONNECTION MODULE

(71) Applicant: Molex, LLC, Lisle, IL (US)

(72) Inventors: Yong Lin, Chengdu (CN); Shang-Xiu Zeng, Chengdu (CN); Kian Heng Lim, Jurong Town (SG)

(73) Assignee: Molex, LLC, Lisle, IL (US)

( * ) Notice: Subject to any disclaimer, the term of this patent is extended or adjusted under 35 U.S.C. 154(b) by 876 days.

(21) Appl. No.: 17/698,163

(22) Filed: Mar. 18, 2022

(65) Prior Publication Data

US 2022/0320602 A1    Oct. 6, 2022

(30) Foreign Application Priority Data

Apr. 6, 2021   (CN) .......................... 202110367660.3

(51) Int. Cl.
*H01M 50/519*   (2021.01)
*H01M 10/42*    (2006.01)
*H01M 50/204*   (2021.01)
*H01M 50/256*   (2021.01)
*H01M 50/507*   (2021.01)
*H05K 1/18*     (2006.01)

(52) U.S. Cl.
CPC ....... *H01M 50/519* (2021.01); *H01M 10/425* (2013.01); *H01M 50/204* (2021.01); *H01M 50/256* (2021.01); *H01M 50/507* (2021.01); *H05K 1/189* (2013.01); *H05K 2201/10181* (2013.01)

(58) Field of Classification Search
CPC .................................................. H01M 50/519
See application file for complete search history.

(56) References Cited

U.S. PATENT DOCUMENTS

| | | | |
|---|---|---|---|
| 2013/0302651 A1* | 11/2013 | Kim | H01M 10/425 429/7 |
| 2019/0027731 A1* | 1/2019 | Zeng | H01M 50/51 |
| 2019/0088918 A1* | 3/2019 | Goh | H01M 50/519 |
| 2020/0203777 A1 | 6/2020 | Wang et al. | |

FOREIGN PATENT DOCUMENTS

| | | |
|---|---|---|
| CN | 203691758 U | 7/2014 |
| CN | 209787546 U | 12/2019 |
| CN | 210136984 U | 3/2020 |
| CN | 210224157 U | 3/2020 |
| CN | 211789255 U | 10/2020 |
| CN | 212874704 U | 4/2021 |
| EP | 3742538 A1 | 11/2020 |
| JP | 2013197090 A | 9/2013 |

(Continued)

*Primary Examiner* — Nicholas A Smith

(57) ABSTRACT

A battery connection module is used to connect a plurality of batteries, the battery connection module includes a carrying tray, a plurality of busbars, a first circuit board, a second circuit board and a bridging circuit board. The plurality of busbars are assembled on the carrying tray, the plurality of busbars are used to connect the plurality of batteries in series. The first circuit board is used to connect the plurality of busbars. The second circuit board is separated from the first circuit board and includes a plurality of electronic elements. The bridging circuit board is used to bridge the first circuit board and the second circuit board. The bridging circuit board includes a plurality of fuses thereon.

22 Claims, 8 Drawing Sheets

(56) References Cited

FOREIGN PATENT DOCUMENTS

| | | |
|---|---|---|
| JP | 2015022965 A | 2/2015 |
| JP | 2019023996 A | 2/2019 |
| JP | 2019029173 A | 2/2019 |
| JP | 2019057498 A | 4/2019 |
| JP | 2020013766 A | 1/2020 |
| JP | 2020191279 A | 11/2020 |
| KR | 20110062284 A | 6/2011 |
| KR | 20190130927 A | 11/2019 |
| TW | I651892 B | 2/2019 |
| WO | 2012075948 A1 | 6/2012 |
| WO | 2020122404 A1 | 6/2020 |
| WO | 2020256264 A1 | 12/2020 |

* cited by examiner

BATTERY CONNECTION MODULE

RELATED APPLICATIONS

The present application claims priority to Chinese Patent Application No. 202110367660.3 filed on Apr. 6, 2021 which is incorporated by reference in its entirety.

TECHNICAL FIELD

The present disclosure relates to the technical field of battery connection module, specifically, relates to a battery connection module having a bridging circuit board.

BACKGROUND ART

Chinese utility model patent application issuance publication No. CN203691758U discloses a flexible printed circuit board, which includes two or more fusing assemblies which are connected in series, each fusing assembly is provided with a connector and a fusing wire which are connected in parallel. In use, the connector of one of the two fusing assemblies is provided as an operating connector, open circuit is set between two soldering pads of the operating connector, and the connector of the other of the two fusing assemblies acts as a backup connector, soldering pads of the backup connector are soldered by a solder so as to be short circuited, which makes the fusing wire which is connected with the backup connector in parallel short circuited, which is equivalent to that the backup connector directly acts as a conductive wire. On one hand, in the fusing modules, when the circuit is in over-current, the fusing wire connected with the operating connector in parallel may be fused to play over-current protection function, on the other hand, it is convenient to repair, when the fusing wire connected with the operating connector in parallel is fused, as long as the solder soldered on the backup connector is removed and the two soldering pads of the operating connector are soldered by a solder so as to be short circuited, so that the circuit is conducted, the fusing wire connected with the backup connector in parallel can operate.

Chinese utility model patent application issuance publication No. CN209787546U (corresponding to United States patent application publication No. US2020/0203777A1) discloses a circuit board and a battery module, specifically discloses a first branch path and a second branch path, the first branch path is formed with a first fusing zone, the second branch path is formed with a second fusing zone. One end of the second branch path is connected to a sampling end portion or a part of the first branch path except the first fusing zone, the other end of the second branch path is spaced apart from the sampling end portion and the first branch path. During the sampling process of the circuit board, a first pad transmits the collected signal to the external controller via the sampling end portion of the sampling circuit, the first branch path and the outputting end portion. When the first fusing zone of the first branch path is fused (at this time the sampling end portion of the sampling circuit and the outputting end portion are disconnected), because the sampling circuit is further provided with the second branch path, the circuit board can be quickly repaired by means of the second branch path and a second pad to make the electrically connection between the sampling end portion and the outputting end portion conducted during the return repair of the battery module, thereby achieving the purpose of reusing the circuit board.

The above prior arts disclose a technical solution that the same circuit board is provided with the connectors or other electronic elements, and then the circuit board mounted with the connectors or the electronic elements is welded with a busbar. However, if a welding problem between the circuit board and the busbar in the welding operation of the circuit board occurs, the entire circuit board having a high value may be scrapped. And in use, when the circuit is in over-current, a fusing wire or path will be fused. Although the fusing wire or path disclosed by the above prior arts may be repaired, but only may be repaired once, and when the fusing wire or path disclosed by the above prior arts cannot be repaired, the entire circuit board having the high value would be scrapped, even an entire battery pack is scrapped.

SUMMARY

Therefore, an object of the present disclosure is to provide a battery connection module which can improve at least one deficiency in the prior art.

In an embodiment, a battery connection module of the present disclosure is used to connect a plurality of batteries, the battery connection module comprises a carrying tray, a plurality of busbars, a first circuit board, a second circuit board and a bridging circuit board. The plurality of busbars are assembled on the carrying tray, the plurality of busbars are used to connect the plurality of batteries in series. The first circuit board is used to connect the plurality of busbars. The second circuit board is separated from the first circuit board and comprises a plurality of electronic elements. The bridging circuit board is used to bridge the first circuit board and the second circuit board.

In some implementing manners, the bridging circuit board and the first circuit board and the second circuit board are detachable connection therebetween.

In some implementing manners, two end portions of the bridging circuit board are connected with the first circuit board and the second circuit board via connectors.

In some implementing manners, the bridging circuit board is constructed as a flexible circuit board.

In some implementing manners, the first circuit board and the second circuit board each are constructed as a rigid circuit board.

In some implementing manners, two end portions of the flexible circuit board are respectively connected by two flexible circuit board connectors which are respectively mounted on the first circuit board and the second circuit board.

In some implementing manners, the carrying tray has a first circuit board mounting region which is used to mount the first circuit board and a second circuit board mounting region which is used to mount the second circuit board.

In some implementing manners, the carrying tray and the first circuit board and the second circuit board are provided with snapping posts and snapping holes.

In some implementing manners, the first circuit board and each busbar are connected by a conductive piece.

In some implementing manners, the conductive piece comprises a circuit board connecting segment, a busbar connecting segment and a buffering segment which is positioned between the circuit board connecting segment and the busbar connecting segment.

In another embodiment, a battery connection module of the present disclosure is used to connect a plurality of batteries, the battery connection module comprises a carrying tray, a plurality of busbars, a first circuit board, a second circuit board and a bridging circuit board. The plurality of busbars are assembled on the carrying tray, the plurality of busbars are used to connect the plurality of batteries in series. The first circuit board is used to connect the plurality of busbars. The second circuit board is separated from the first circuit board and comprises a plurality of electronic elements. The bridging circuit board is used to bridge the first circuit board and the second circuit board, the bridging circuit board comprises a plurality of fuses thereon.

In some implementing manners, the plurality of fuses each are constructed as a fusing wire provided on the bridging circuit board.

In some implementing manners, the bridging circuit board and the first circuit board and the second circuit board are detachable connection therebetween.

In some implementing manners, two end portions of the bridging circuit board are connected with the first circuit board and the second circuit board via connectors.

In some implementing manners, the bridging circuit board is constructed as a flexible circuit board.

In some implementing manners, the first circuit board and the second circuit board each are constructed as a rigid circuit board.

In some implementing manners, two end portions of the flexible circuit board are respectively connected by two flexible circuit board connectors which are respectively mounted on the first circuit board and the second circuit board.

In some implementing manners, the carrying tray has a first circuit board mounting region which is used to mount the first circuit board and a second circuit board mounting region which is used to mount the second circuit board.

In some implementing manners, the carrying tray and the first circuit board and the second circuit board are provided with snapping posts and snapping holes.

In some implementing manners, the first circuit board and each busbar are connected by a conductive piece.

In some implementing manners, the conductive piece comprises a circuit board connecting segment, a busbar connecting segment and a buffering segment which is positioned between the circuit board connecting segment and the busbar connecting segment.

One embodiment of the present disclosure has following advantage or beneficial effect.

The battery connection module of the present disclosure includes the first circuit board and the second circuit board which are separated from each other and the bridging circuit board which acts as a bridge connected between the first circuit board and the second circuit board, the first circuit board and the second circuit board can be separated from each other to have different functions and effects, for example, the first circuit board is used to connect the busbar and provide the temperature sensor, and the second circuit board is used to provide the plurality of electronic elements including the electrical connector and the like. When one of the first circuit board and the second circuit board is damaged, it only needs to replace the damaged circuit board, and does not need to replace the other circuit board, which avoids the problem existing in prior art that the entire circuit board will be scrapped. Therefore, the battery connection module of the present disclosure has advantage of lower maintenance cost.

Moreover, the bridging circuit board of the present disclosure further includes the plurality of fuses thereon, the plurality of fuse each are constructed as a fusing wire provided on the bridging circuit board. When the operating circuit is in over-current, the fusing wire on the bridging circuit board will be fused, it only need to simply replace the bridging circuit board, and does not need replace the first circuit board and the second circuit board, which has advantage that repairing is simple and cost is low.

BRIEF DESCRIPTION OF THE DRAWINGS

The above and other features and advantages of the present disclosure will become more apparent from the detailed description of example embodiments thereof with reference to the accompanying drawings.

DETAILED DESCRIPTION OF THE PREFERRED EMBODIMENT

Figure 1:
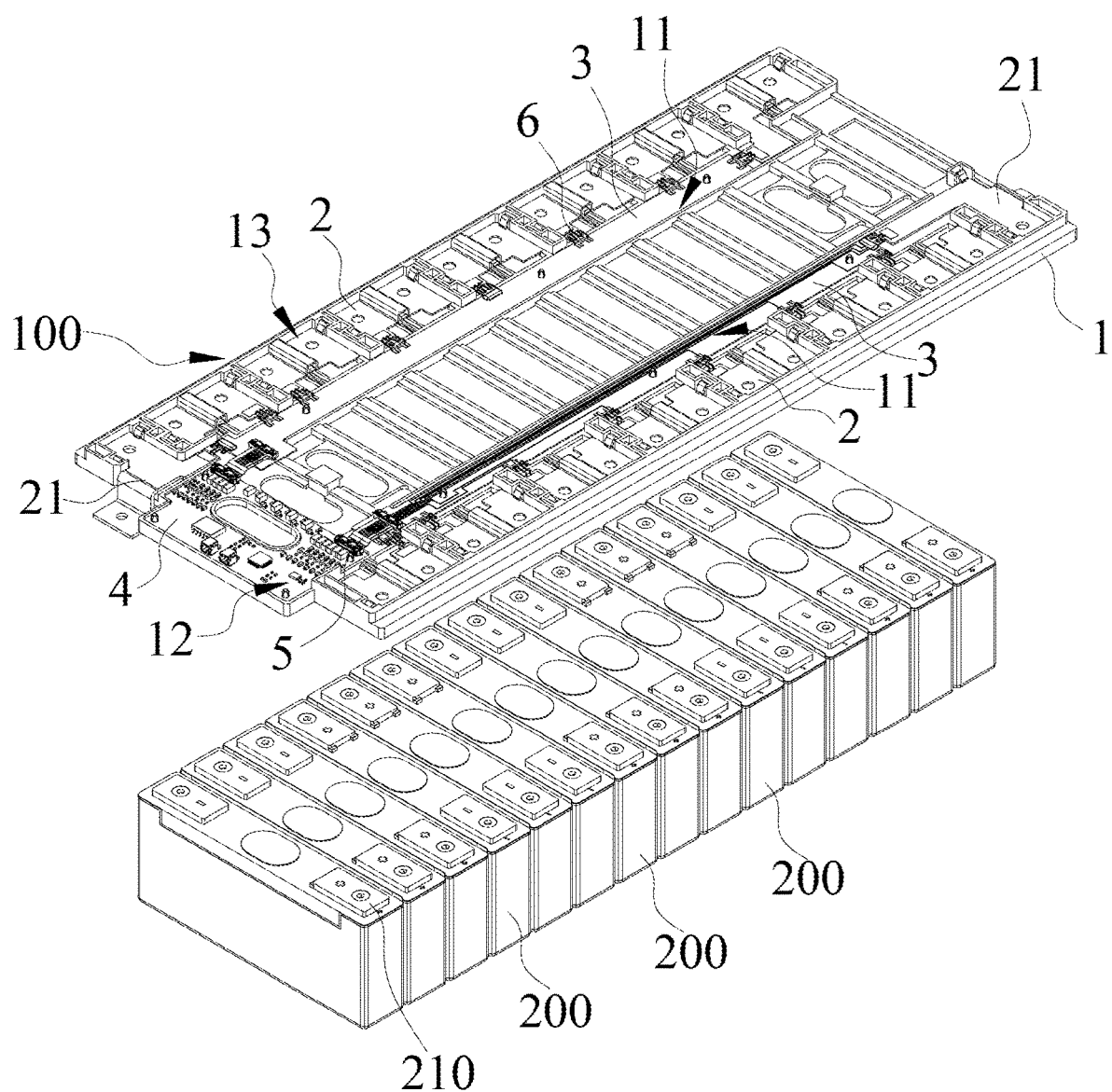
FIG. 1 is a perspective exploded view of a battery connection module and a plurality of batteries of an embodiment of the present disclosure.

Example embodiments will now be described more fully with reference to the accompanying drawings. Example embodiments, however, can be embodied in various forms and should not be construed as limited to the embodiments set forth herein; rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

As shown in FIG. 1, FIG. 1 is a perspective exploded view of a battery connection module 100 and a plurality of batteries 200 of an embodiment of the present disclosure. The battery connection module 100 of the embodiment of the present disclosure is used to connect a plurality of batteries 200, and is used to detect voltages, temperatures or other battery parameters of the plurality of batteries 200.

Figure 2:
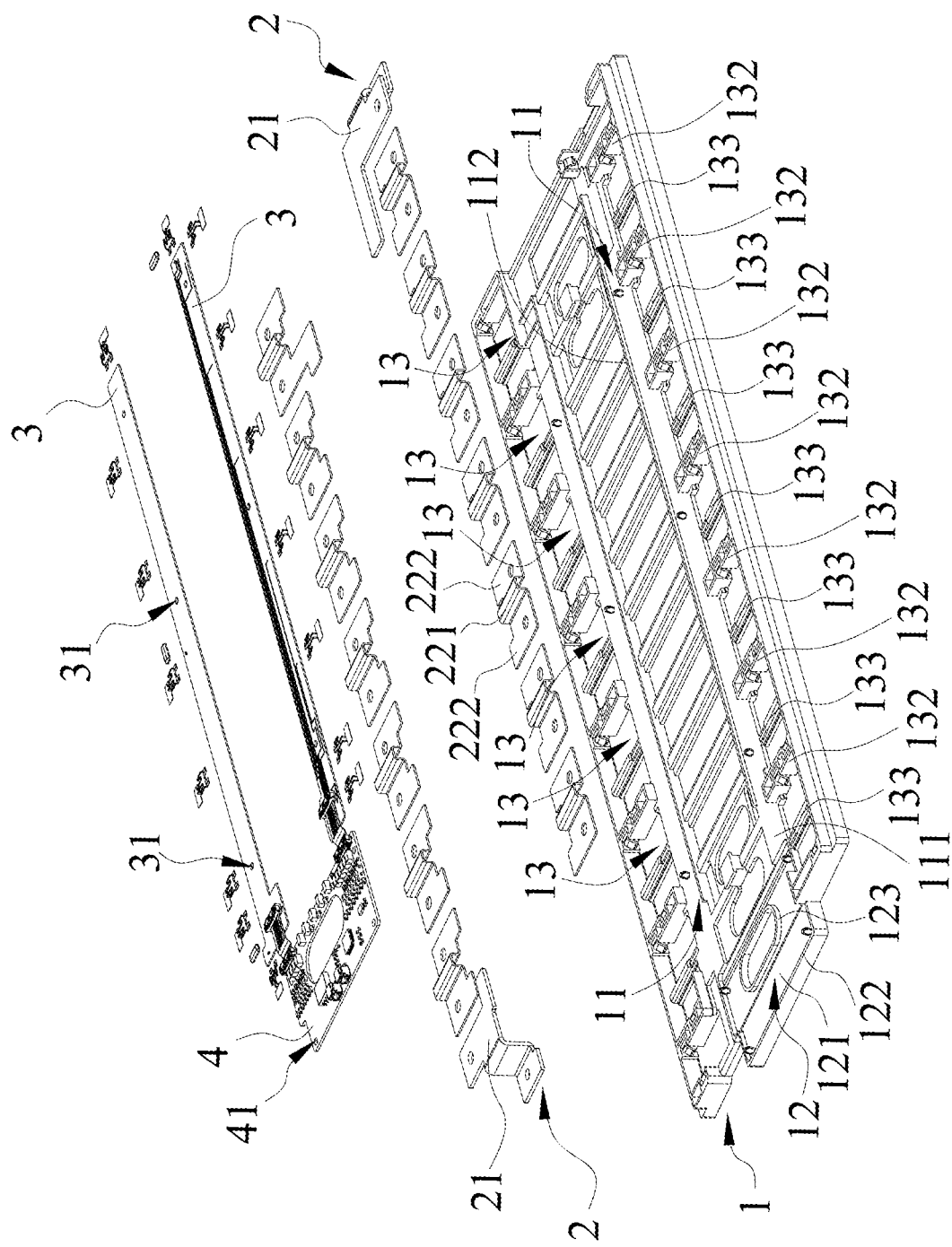
FIG. 2 is a perspective exploded view of a battery connection module of an embodiment of the present disclosure.
Figure 3:
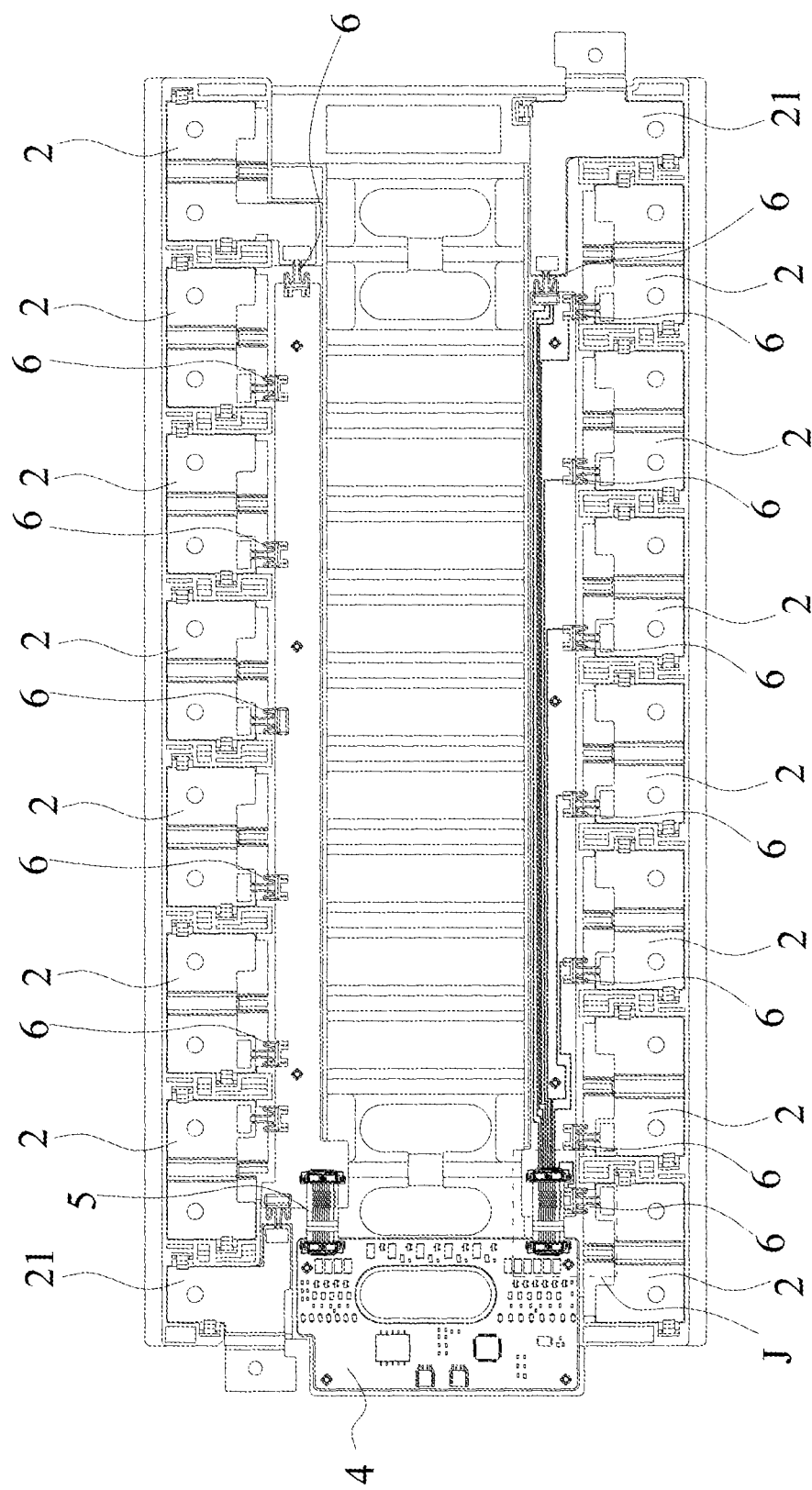
FIG. 3 is a top view of a battery connection module of an embodiment of the present disclosure.

As shown in FIG. 1 to FIG. 3, FIG. 2 is a perspective exploded view of the battery connection module 100 of an embodiment of the present disclosure. FIG. 3 is a top view of the battery connection module 100 of an embodiment of the present disclosure. The battery connection module 100 of the embodiment of the present disclosure includes a carrying tray 1, a plurality of busbars 2, a first circuit board 3, a second circuit board 4 and a bridging circuit board 5. The plurality of busbars 2 are assembled on the carrying tray 1, the plurality of busbars 2 are used to connect the plurality of batteries 200 in series. The first circuit board 3 is used to connect the plurality of busbars 2. The second circuit board 4 is separated from the first circuit board 3, and includes a plurality of electronic elements 43. The bridging circuit board 5 is used to bridge the first circuit board 3 and the second circuit board 4. These electronic elements 43 may include an electrical connector 42.

Figure 4:
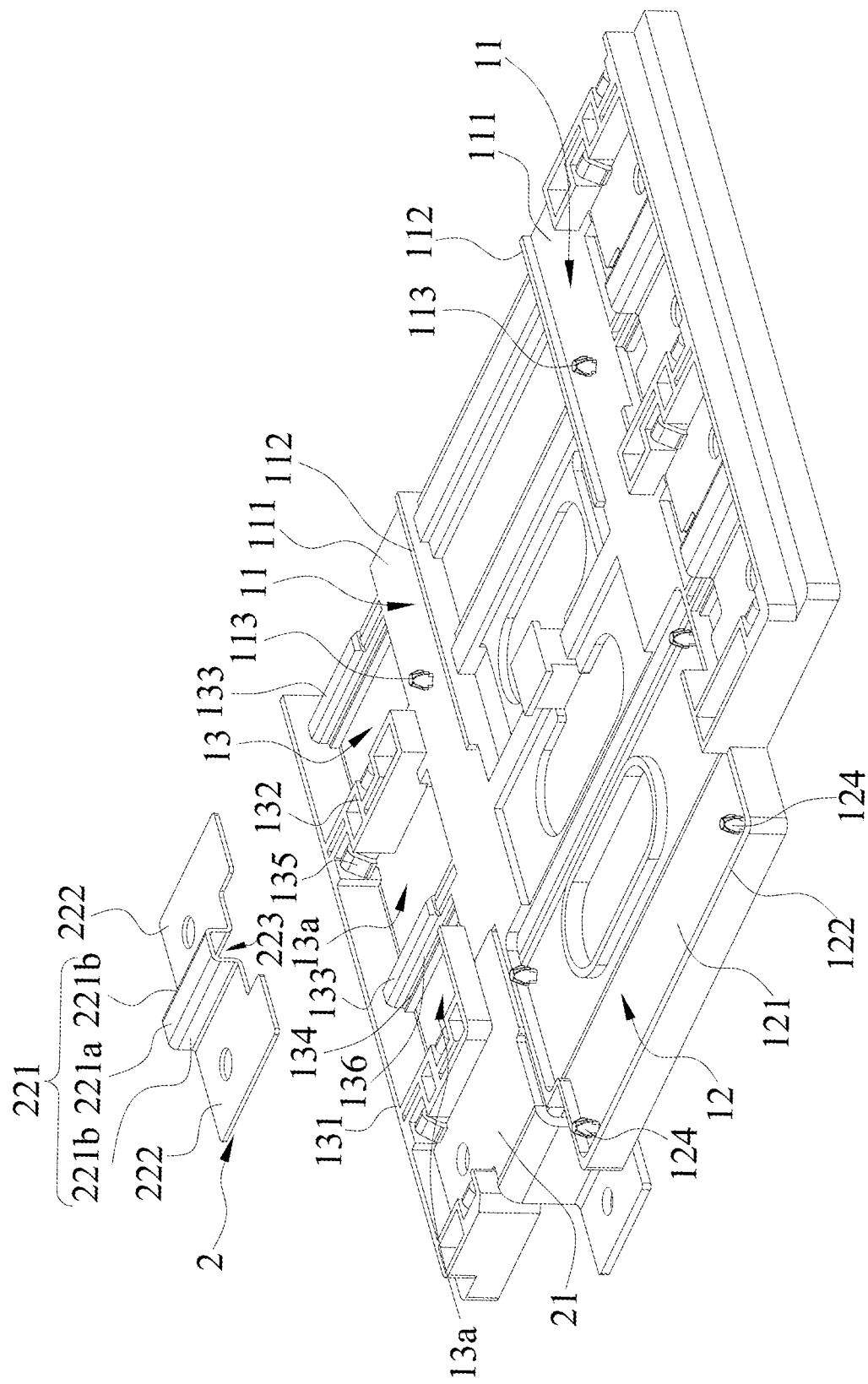
FIG. 4 is a perspective exploded view of a carrying tray and busbars of an embodiment of the present disclosure.

As shown in FIG. 2 and FIG. 4, FIG. 4 is a perspective exploded view of a carrying tray 1 and busbars 2 of an embodiment of the present disclosure. For example, the carrying tray 1 may be integrally formed by an insulating material, and includes a first circuit board mounting region 11, a second circuit board mounting region 12 and a plurality of receiving grooves 13. The first circuit board mounting region 11 is used to mount the first circuit board 3, the second circuit board mounting region 12 is used to mount the second circuit board 4, the receiving groove 13 is used to mount the busbar 2.

As shown in FIG. 2, the first circuit board mounting region 11 is two in number, the second circuit board mounting region 12 is one in number. The second circuit board mounting region 12 may be positioned at an end portion of the carrying tray 1. Each first circuit board mounting region 11 may be substantially elongated, and the two first circuit board mounting regions 11 are provided to face each other. One end of the first circuit board mounting region 11 is provided close to the second circuit board mounting region 12, the other end of the first circuit board mounting region 11 extends away from the second circuit board mounting region 12. It is noted that, the definition in number for the first circuit board mounting region 11 and the second circuit board mounting region 12 is only for explanation, a person skilled in the art may be adjusted as desired, and thus the present disclosure is not limited to the above description.

The plurality of receiving grooves 13 may be divided into two groups, the receiving grooves 13 of each group are arranged sided by side along an extending direction of the first circuit board mounting region 11. The two groups of receiving grooves 13 are respectively provided corresponding to the two first circuit board mounting regions 11, and the two groups of receiving grooves 13 are respectively provided on outer sides of the two first circuit board mounting regions 11 of the carrying tray 1.

As shown in FIG. 2 and FIG. 4, the plurality of busbars 2 may be divided into two groups, the two groups of busbars 2 are respectively mounted in the two groups of receiving grooves 13. Busbars 2 of each group are arranged sided by side along the extending direction of the first circuit board mounting region 11, and the busbar in each group of busbars which is positioned at one end of each group of busbars is an output busbar 21, the two output busbars 21 may respectively represent a positive electrode and a negative electrode of a battery pack including the plurality of batteries, and are respectively used to connect with a positive electrode and a negative electrode of an external load.

Each busbar 2 may be formed by integrally bending a conductive material. Except the two output busbars 21, the remaining busbars 2 of the plurality of busbars 2 each include an arching portion 221 and two electrode connecting portions 222. The two electrode connecting portions 222 are respectively positioned at two opposite sides of the arching portion 221, and are used to electrically connect with the electrodes 210 of the corresponding batteries 200.

The arching portion 221 includes a top wall 221a and two side walls 221b, the two side walls 221b are respectively connected to two sides of the top wall 221a, so that a space 223 is enclosed by the top wall 221a and the two side walls 221b. The two electrode connecting portions 222 are respectively connected to outer sides of the two side walls 221b.

As shown in FIG. 2 and FIG. 4, the carrying tray 1 includes a lateral wall 131 and a plurality of partitioning walls 132. The lateral wall 131 may extend along the extending direction of the first circuit board mounting region 11. The plurality of partitioning walls 132 are provided to space apart from each other along the extending direction of the first circuit board mounting region 11, and the plurality of partitioning walls 132 each make one end connected to the lateral wall 131 and make the other end extend toward the interior of the carrying tray 1, so as to partition the plurality of the receiving grooves 13. In an implementing manner, each partitioning wall 132 may be perpendicular to the lateral wall 131, but the present disclosure is not limited thereto, for example, the partitioning wall 132 and the lateral wall 131 also may be provided to be obliquely intersected.

The carrying tray 1 further includes a plurality of supporting portions 133, each receiving groove 13 is provided with one supporting portion 133 therein. The supporting portion 133 may be an elongated structure and is provided to be parallel to the partitioning wall 132, so as to partition the one receiving groove 13 into two sub-recessed grooves 13a. That is to say, along the extending direction of the first circuit board mounting region 11, the plurality of supporting portions 133 and the plurality of partitioning walls 132 alternately provided. An inner wall 136 of each sub-recessed groove 13a is further provided with a bearing portion 134, the bearing portion 134 is used to bear the busbar 2. When the busbar 2 is mounted in the receiving groove 13, the supporting portion 133 enters into the space 223 of the busbar 2 to support the arching portion 221 of the busbar 2. The two electrode connecting portions 222 of the busbar 2 are respectively received in the two sub-recessed grooves 13a and respectively born by the two bearing portions 134.

The carrying tray 1 further includes a plurality of pressing members 135, each sub-recessed groove 13a may be provided with one or more pressing members 135. When the busbar 2 is mounted in the receiving groove 13, the pressing members 135 can press against a side of the electrode connecting portions 222 away from the bearing portion 134 to prevent the busbar 2 from being released from the receiving groove 13. In an implementing manner, the pressing member 135 may be an elastic latching member, but the present disclosure is not limited thereto.

It is noted that, under cooperating action of the bearing portions 134, the supporting portion 133 and the pressing members 135, the busbar 2 is limited in the receiving groove 13, however, the busbar 2 is not absolutely fixed relative to the carrying tray 1, but the busbar 2 may be slightly movable relative to the carrying tray 1, so as to accommodate a subsequent ultrasonic welding process.

Figure 6:
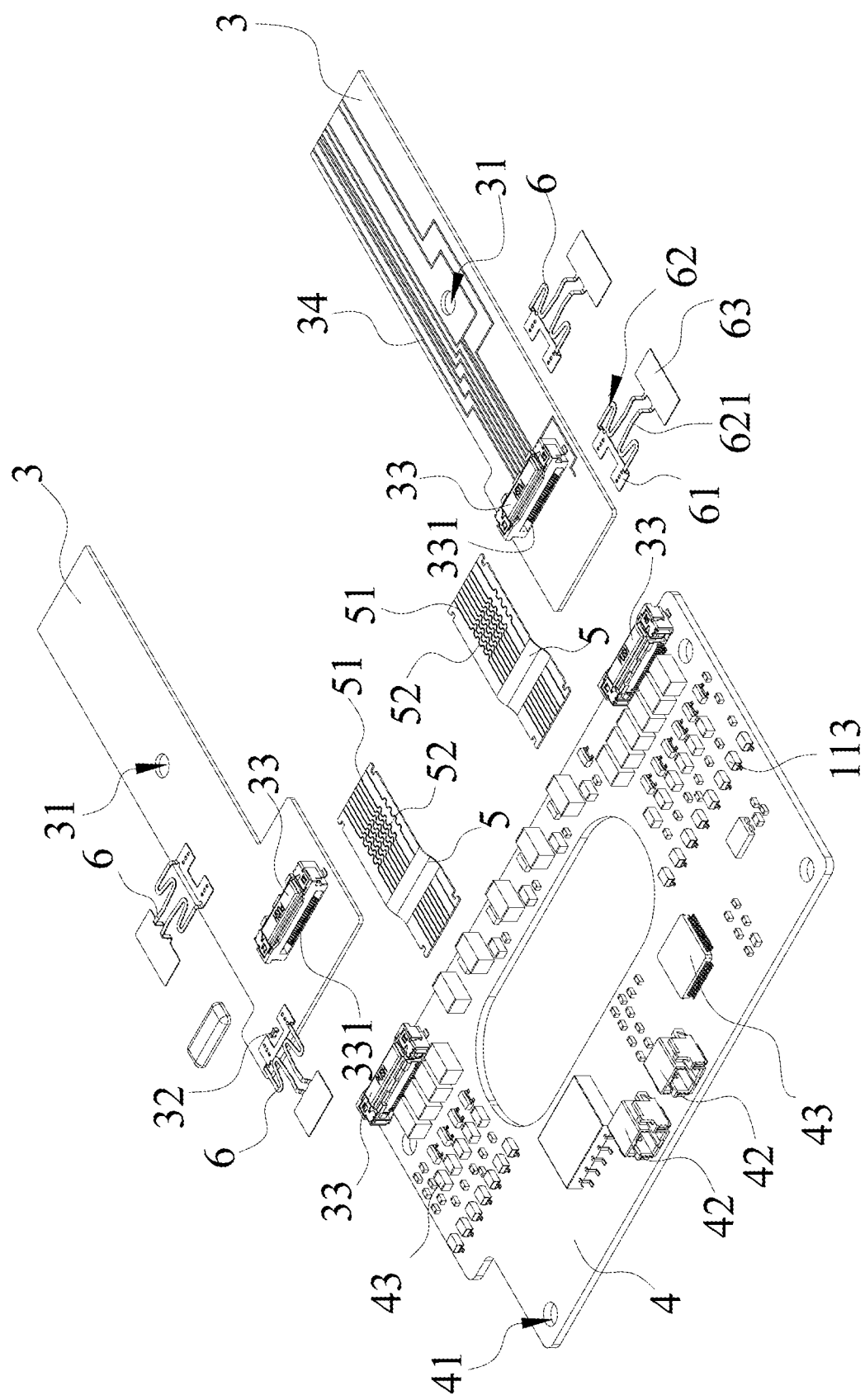
FIG. 6 is a perspective exploded view of the battery connection module of an embodiment of the present disclosure with the carrying tray and the busbars removed.

As shown in FIG. 2 and FIG. 4, the first circuit board mounting region 11 and the second circuit board mounting region 12 each may be a recessed groove structure, when the first circuit board 3 and the second circuit board 4 are assembled on the carrying tray 1, the first circuit board 3 and the second circuit board 4 can be respectively received in the first circuit board mounting region 11 and the second circuit board mounting region 12. As shown in FIG. 6, preferably, the first circuit board 3 and the second circuit board 4 each may be constructed as a rigid circuit board.

The first circuit board mounting region 11 includes a first bottom plate 111 and a first fence 112, the first fence 112 protrudes from the first bottom plate 111. The first bottom plate 111, the first fence 112 and the plurality of partitioning walls 132 adjacent to the first bottom plate 111 together form the first circuit board mounting region 11.

As shown in FIG. 2 and FIG. 4, the first circuit board 3 and the carrying tray 1 may be detachably connected in a manner that a snapping hole 31 and the snapping post 113 cooperate with each other. Specifically, the first bottom plate 111 is provided with the snapping post 113 protruding therefrom, the first circuit board 3 is opened with the snapping hole 31, when the first circuit board 3 is mounted to the carrying tray 1, the snapping post 113 passes through the snapping hole 31 and snaps with an edge of the snapping hole 31.

The second circuit board mounting region 12 includes a second bottom plate 121 and a second fence 122, the second fence 122 protrudes from the second bottom plate 121, the second fence 122 and the second bottom plate 121 together form the second circuit board mounting region 12.

The second circuit board 4 and the carrying tray 1 may be detachably connected in a manner that a snapping hole 41 and a snapping post 124 cooperate with each other. Specifically, the second bottom plate 121 is provided with the snapping post 124 protruding therefrom, the second circuit board 4 is opened with the snapping hole 41, when the second circuit board 4 is mounted to the carrying tray 1, the snapping post 124 passes through the snapping hole 41 and snaps with an edge of the snapping hole 41.

Certainly, it may be understood that, the first circuit board 3 and the second circuit board 4 further may be connected to the carrying tray 1 by other structures, for example, a bolt.

Figure 5:
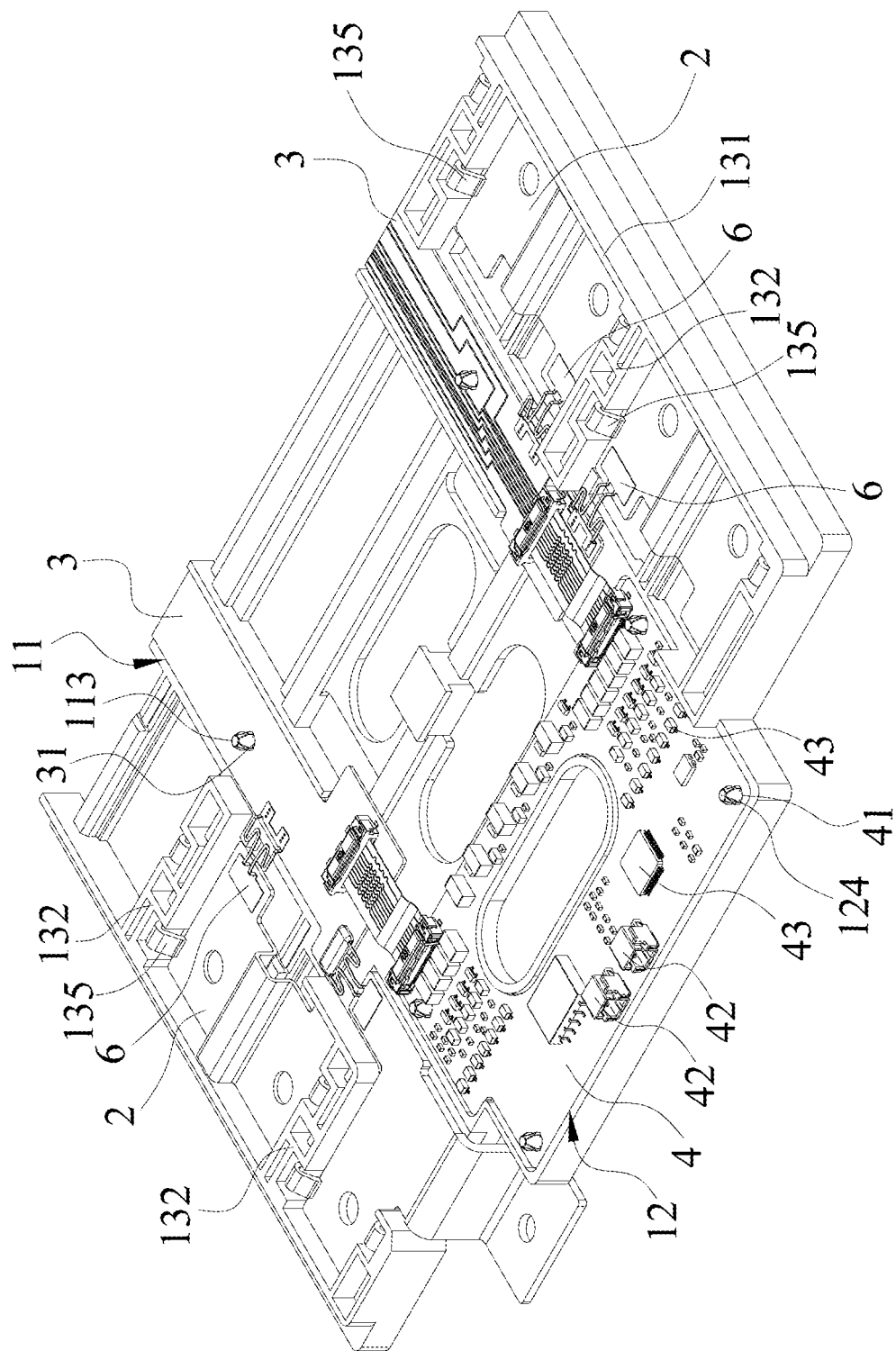
FIG. 5 is a partial perspective view of the battery connection module of an embodiment of the present disclosure.

As shown in FIG. 3, FIG. 5 and FIG. 6, the first circuit board 3 and each busbar 2 are connected by a conductive piece 6. The conductive piece 6 and the busbar 2 are the same in number, the plurality of busbars 2 are connected to the first circuit board 3 respectively by the plurality of conductive pieces 6.

The conductive piece 6 may include a circuit board connecting segment 61, a busbar connecting segment 63 and a buffering segment 62 positioned between the circuit board connecting segment 61 and the busbar connecting segment 63. The circuit board connecting segment 61 is used to electrically connect with one end of an conductive wire 34 of the first circuit board 3, the busbar connecting segment 63 is used to connect the busbar 2. The other end of the conductive wire 34 is used to electrically connect with a flexible circuit board connector 33 which is provided on the first circuit board 3. The buffering segment 62 has two buffering bars 621, the buffering segment 62 has lower stiffness and has elasticity, when relative movement between the first circuit board 3 and the busbar 2 is generated, the buffering segment 62 can compensate the relative movement, which avoids damaging the entire conductive piece 6. The first circuit board 3 may be provided with a temperature sensor 32 at a position close to the conductive piece 6, a location of the circuit board connecting segment 61 of the conductive piece 6 corresponding to the temperature sensor 32 is provided with an opening.

Figure 7:
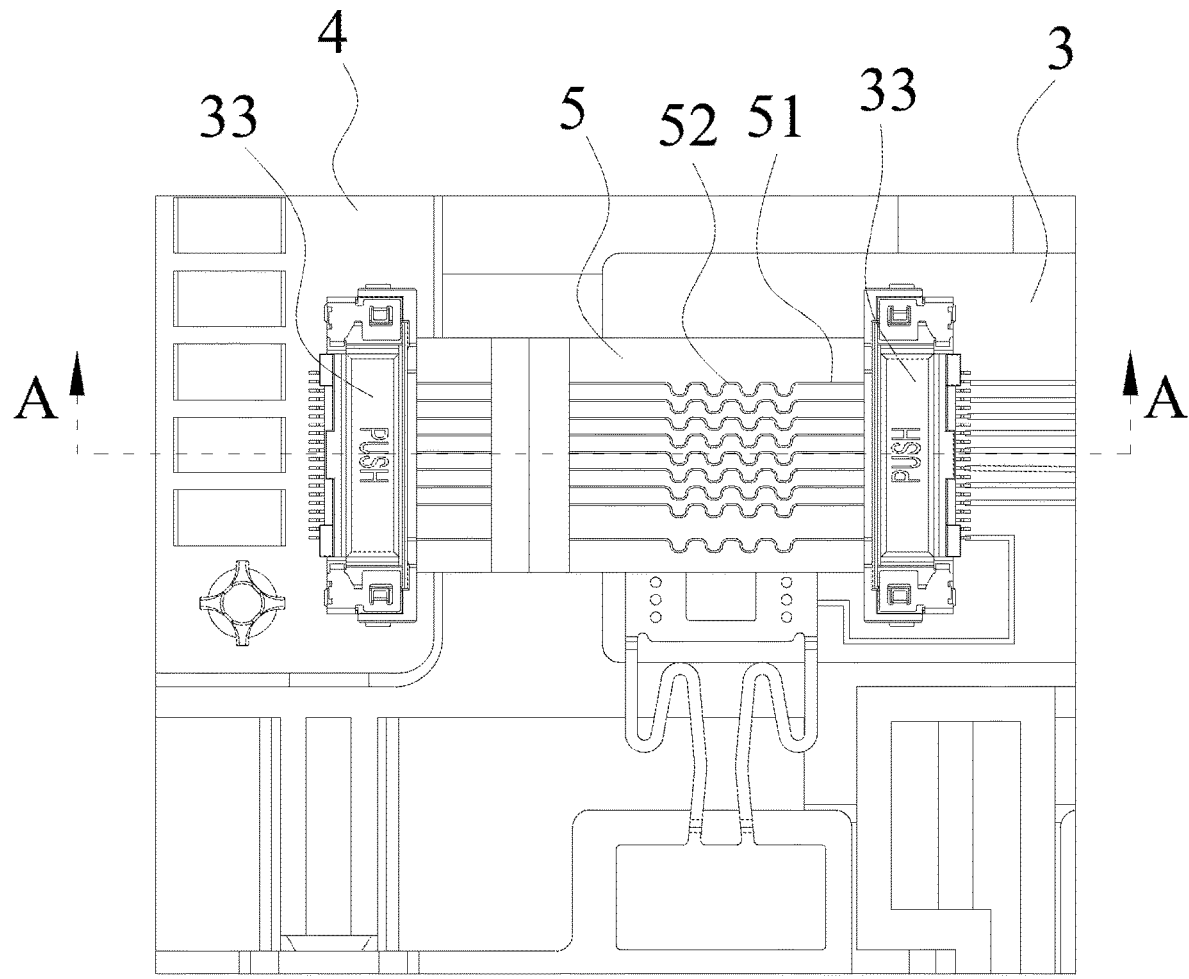
FIG. 7 is a partially enlarged view of a part of FIG. 3 indicated by J.
Figure 8:
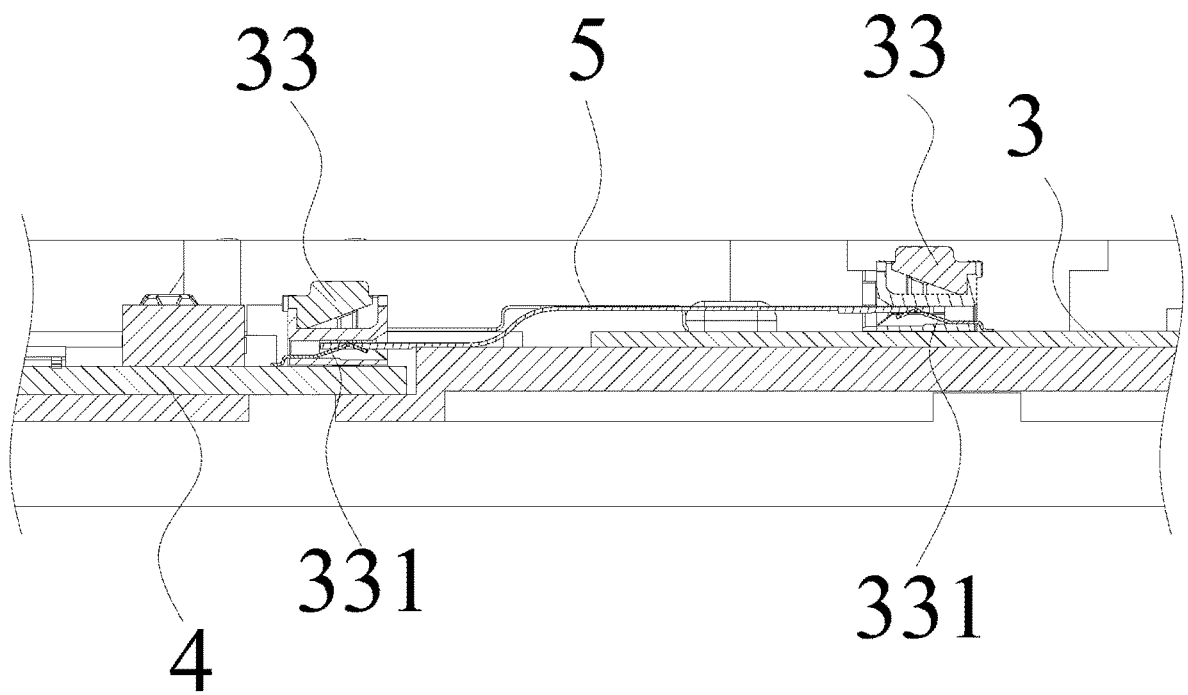
FIG. 8 is a cross sectional view taken along a line A-A of FIG. 7.

As shown in FIG. 3 and FIG. 6 to FIG. 8, FIG. 7 is a partially enlarged view of a part of FIG. 3 indicated by J, FIG. 8 is a cross sectional view taken along a line A-A of FIG. 7. The bridging circuit board 5 is used to bridge the first circuit board 3 and the second circuit board 4, so that the bridging circuit board 5 acts as a bridge between the first circuit board 3 and the second circuit board 4, the first circuit board 3 and the second circuit board 4 can are separated from each other to have different functions and effects. For example, the first circuit board 3 may be used to connect the busbar 2 and provide the temperature sensor 32, the second circuit board 4 may be used to provide the plurality of electronic elements 43 including the electrical connector 42 and the like.

When one of the first circuit board 3 and the elements provided thereon and the second circuit board 4 and the elements provided thereon is damaged, it only needs to replace the damaged circuit board (the first circuit board 3 or the second circuit board 4). In comparison with a case in prior art that an entire circuit board will be scrapped if a welding problem occurs, the present disclosure does not need to replace all the circuit boards and has advantage of lower maintenance cost.

The bridging circuit board 5 and the first circuit board 3 and the second circuit board 4 are detachable connection therebetween. So, when it needs to replace the first circuit board 3 or the second circuit board 4, it may conveniently separate the damaged circuit board from the bridging circuit board 5 and conveniently connect a new circuit board and the bridging circuit board 5.

The bridging circuit board 5 may be constructed as flexible circuit board (FPC). The flexible circuit board is a special printed circuit board, based on the layer number of a conductive copper foil, the flexible printed circuit board may be classified as a single layer board, double face board, double layer board, multiple layer board and the like. The present disclosure embodiment does not make special limitation with respect to this. With the flexible circuit board, it is more convenient to detach or mount the bridging circuit board 5 and the first circuit board 3 and/or the second circuit board 4.

As shown in FIG. 3 and FIG. 7, two end portions of the bridging circuit board 5 are respectively connected with the first circuit board 3 and the second circuit board 4 via connectors. The first circuit board 3 is provided with the flexible circuit board connector 33 thereon, the second circuit board 4 is similarly provided with the flexible circuit board connector 33 thereon. The two end portions of the bridging circuit board 5 are respectively connected to the two flexible circuit board connectors 33 in a pluggable manner.

As shown in FIG. 6 and FIG. 8, the bridging circuit board 5 is provided with a plurality of conductive wires 51, one end of each of the plurality of conductive wires 51 is exposed to an outer wall surface of one end of the bridging circuit board 5, the other end of each of the plurality of conductive wires 51 is exposed to an outer wall surface of the other end of the bridging circuit board 5. The flexible circuit board connector 33 is provided with a plurality of terminals 331. When each end of the bridging circuit board 5 is inserted into the flexible circuit board connector 33, the exposed parts of the plurality of conductive wires 51 at each end can respectively electrically contact the plurality of terminals 331 to make the first circuit board 3 and the second circuit board 4 conducted.

As shown in FIG. 6, another embodiment of the battery connection module 100 of the present disclosure differs from the above embodiment in that: the bridging circuit board 5 includes a plurality of fuses 52. It may understood that, the fuse 52 is: after a current exceeds a preset value for a certain time, heat generated by the fuse 52 itself makes a fuse-link fused, the current flowing through the fuse 52 is interrupted, so as to play over-current protection function.

In the present embodiment, the plurality of fuses 52 each are constructed as a fusing wire provided on the bridging circuit board 5, the fusing wire is connected with an operating circuit of the battery connection module 100 of the embodiment of the present disclosure, and may be fused when the operating circuit is in over-current so as to play over-current protection effect.

In conclusion, the battery connection module 100 of the present disclosure includes the first circuit board 3 and the second circuit board 4 which are separated from each other and the bridging circuit board 5 which acts as a bridge connected between the first circuit board 3 and the second circuit board 4, the first circuit board 3 and the second circuit board 4 can be separated from each other to have different functions and effects, for example, the first circuit board 3 is used to connect the busbar 2 and provide the temperature sensor 32, and the second circuit board 4 is used to provide the plurality of electronic elements 43 including the electrical connector 42 and the like. When one of the first circuit board 3 and the second circuit board 4 is damaged, it only needs to replace the damaged circuit board, and does not need to replace the other circuit board, which avoids the problem existing in prior art that the entire circuit board will be scrapped. Therefore, the battery connection module 100 of the present disclosure has advantage of lower maintenance cost.

Moreover, the bridging circuit board 5 of the present disclosure further includes the plurality of fuses 52 thereon, the plurality of fuse 52 each are constructed as a fusing wire provided on the bridging circuit board 5. When the operating circuit is in over-current, the fusing wire on the bridging circuit board 5 will be fused, it only need to simply replace the bridging circuit board 5, and does not need replace the first circuit board 3 and the second circuit board 4, which has advantage that repairing is simple and cost is low.

In the embodiments of the present disclosure, the terms "first" and "second" are only used for the purpose of description, and cannot be construed as indicating or implying relative importance; the term "plurality" refers to two or more, unless otherwise there are clear limits. The terms "mounted", "connected with", "connect", "fixed" and other terms should be understood in a broad sense. For example, "connect" can be a fixed connection, a detachable connection, or an integral connection; "connected with" can be direct connection or indirect connection through an intermediary. Those of ordinary skill in the art can understand the specific meanings of the above terms in the embodiments of the present disclosure according to specific situations.

In the description of the embodiments of the present disclosure, it should be understood that the orientations or positional relationships indicated by the terms "upper", "lower", "left", "right", "front", "rear", etc. are based on those shown in the accompanying drawings. The orientation or positional relationship is only for the convenience of describing the embodiments of the disclosure and simplifying the description, rather than indicating or implying that the device or unit referred to must have a specific direction, be constructed and operated in a specific orientation, and therefore should not be construed as limit to embodiments of present disclosure.

In the description of this specification, the description of the terms "one embodiment", "some embodiments", "specific embodiment", etc. means that a specific feature, structure, material or characteristic described in connection with the embodiment or example is included in at least one embodiment or example of embodiments of the present disclosure. In this specification, schematic expressions of the above terms do not necessarily refer to the same embodiment or example. Furthermore, the specific feature, structure, material or characteristic described may be combined in any suitable manner in any one or more embodiments or examples The above are only preferred embodiments of the embodiments of the present disclosure, and are not intended to limit the embodiments of the present disclosure. For those skilled in the art, the embodiments of the present disclosure may have various modifications and changes. Any modifications, equivalent replacements, improvements, etc. made within the spirit and principles of the embodiments of the present disclosure should be included within the protection scope of the embodiments of the present disclosure.

What is claimed is:

1. A battery connection module for connecting a plurality of batteries, the battery connection module comprising:
   a carrying tray;
   a plurality of busbars assembled on the carrying tray, the plurality of busbars configured to connect the plurality of batteries in series;
   a first circuit board configured to be coupled to the plurality of busbars;
   a second circuit board comprising a plurality of electronic elements, the first and second circuit boards being separate circuit boards;
   a bridging circuit board configured to couple to the first circuit board to the second circuit board; and
   a connector configured to be detachably connected to an end portion of the bridging circuit board and detachably connected to one of the first circuit board and the second circuit board.

2. The battery connection module according to claim 1, wherein the connector defines a first connector detachably connected to a first end portion of the bridging circuit board and detachably connected to the first circuit board, and further comprising a second connector configured to be detachably connected to a second end portion of the bridging circuit board and detachably connected to the second circuit board.

3. The battery connection module according to claim 2, wherein the bridging circuit board is a flexible circuit board.

4. The battery connection module according to claim 3, wherein each of the first circuit board and the second circuit board is a rigid circuit board.

5. The battery connection module according to claim 3, wherein each connector is a flexible circuit board connector, wherein the first connector is mounted on the first circuit board and the second connector is mounted on the second circuit board.

6. The battery connection module according to claim 5, wherein the carrying tray has a first circuit board mounting region on which the first circuit board is mounted and a second circuit board mounting region on which the second circuit board is mounted.

7. The battery connection module according to claim 6, wherein the carrying tray, the first circuit board and the second circuit board are provided with snapping posts and snapping holes.

8. The battery connection module according to claim 1, wherein the first circuit board and each busbar are connected by a conductive piece.

9. The battery connection module according to claim 8, wherein the conductive piece comprises a circuit board connecting segment, a busbar connecting segment and a buffering segment which is positioned between the circuit board connecting segment and the busbar connecting segment.

10. The battery connection module according to claim 1, further comprising a sensor on the first circuit board.

11. The battery connection module according to claim 1, further comprising an electrical connector on the second circuit board.

12. A battery connection module for connecting a plurality of batteries, the battery connection module comprising:
   a carrying tray;
   a plurality of busbars assembled on the carrying tray, the plurality of busbars configured to connect the plurality of batteries in series;

a first circuit board configured to be coupled to the plurality of busbars;

a second circuit board comprising a plurality of electronic elements;

a bridging circuit board configured to couple to the first circuit board to the second circuit board, the bridging circuit board comprising a plurality of fuses thereon, the first circuit board, the second circuit board and the bridging circuit board being separate circuit boards;

a first circuit board connector configured to be detachably connected to a first end portion of the bridging circuit board and detachably connected to the first circuit board; and a second circuit board connector configured to be detachably connected to a second end portion of the bridging circuit board and detachably connected to the second circuit board.

13. The battery connection module according to claim 12, wherein the plurality of fuses each are constructed as a fusing wire provided on the bridging circuit board.

14. The battery connection module according to claim 13, wherein the bridging circuit board is a flexible circuit board.

15. The battery connection module according to claim 14, wherein each of the first circuit board and the second circuit board is a rigid circuit board.

16. The battery connection module according to claim 14, wherein each circuit board connector is a flexible circuit board connector, wherein the first circuit board connector is mounted on the first circuit board and the second circuit board connector is mounted on the second circuit board.

17. The battery connection module according to claim 16, wherein the carrying tray has a first circuit board mounting region on which the first circuit board is mounted and a second circuit board mounting region on which the second circuit board is mounted.

18. The battery connection module according to claim 17, wherein the carrying tray, the first circuit board and the second circuit board are provided with snapping posts and snapping holes.

19. The battery connection module according to claim 13, wherein the first circuit board and each busbar are connected by a conductive piece.

20. The battery connection module according to claim 19, wherein the conductive piece comprises a circuit board connecting segment, a busbar connecting segment and a buffering segment which is positioned between the circuit board connecting segment and the busbar connecting segment.

21. The battery connection module according to claim 12, further comprising a sensor on the first circuit board.

22. The battery connection module according to claim 12, further comprising an electrical connector on the second circuit board.

* * * * *